US000001241H

United States Statutory Invention Registration [19]

[11] Reg. Number: H1241

[43] Published: Oct. 5, 1993

Synosky et al.

[54] UNIVERSAL GUM BASE CONCENTRATE

[76] Inventors: Steven P. Synosky, 56 Brandywine Rise, Green Brook, N.J. 08812; Dinah Diaz, 55 Sagamore Ave., Edison, N.J. 08820; Scott Hartman, 12 School La., Roosevelt, N.J. 08555

[21] Appl. No.: 793,799

[22] Filed: Nov. 18, 1991

[51] Int. Cl.[5] ..... A23G 3/30

[52] U.S. Cl. ..... 426/3; 426/6; 426/541; 426/74

[58] Field of Search ..... 426/3-6, 426/72, 74, 541, 542, 543

[56] References Cited

U.S. PATENT DOCUMENTS

| | | | |
|---|---|---|---|
| 1,855,017 | 4/1932 | Geller | 99/135 |
| 1,887,930 | 11/1932 | Hatherell | 99/135 |
| 2,123,531 | 7/1938 | Hatherell | 99/135 |
| 2,125,562 | 8/1938 | Hatherell | 99/135 |
| 2,197,240 | 4/1940 | Hatherell | 99/135 |
| 2,228,100 | 6/1942 | Mahron | 99/135 |
| 2,284,804 | 6/1942 | Angelis | 99/135 |
| 2,383,145 | 8/1945 | Moose | 99/135 |
| 2,468,393 | 4/1949 | Corkery et al. | 99/135 |
| 3,984,574 | 10/1976 | Comollo | 426/4 |
| 4,202,906 | 5/1980 | Ogawa et al. | 426/3 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,352,822 | 10/1982 | Cherukuri et al. | 426/4 |
| 4,357,354 | 11/1982 | Kehoe et al. | 426/3 |
| 4,387,108 | 6/1983 | Koch et al. | 426/4 |
| 4,459,311 | 7/1984 | De Tora et al. | 426/3 |
| 4,721,620 | 1/1988 | Cherukuri et al. | 426/6 |
| 4,794,003 | 12/1988 | Cherukuri et al. | 426/6 |
| 4,872,884 | 10/1989 | Cherukuri et al. | 426/3 |
| 5,023,093 | 6/1991 | Cherukuri et al. | 426/3 |

FOREIGN PATENT DOCUMENTS 2635441 2/1990 France .

*Primary Examiner*—Robert L. Stoll
*Assistant Examiner*—Joseph D. Anthony

[57] ABSTRACT

A universal gum base concentrate is provided which contains about 15-25 weight percent synthetic elastomer, about 40-70 weight percent synthetic elastomer plasticizer including a terpene resin, about 10-25 weight percent wax, about 1-12 weight percent softener and about 0-3 weight percent filler. Minor quantities of antioxidants and other ingredients may also be present. The universal gum base concentrate can separately be blended with various fillers and other chewing gum ingredients to produce a wide variety of gum bases, bubble gums and other chewing gums.

35 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

UNIVERSAL GUM BASE CONCENTRATE

FIELD OF THE INVENTION

The present invention relates to a universal concentrate for a gum base, particularly for a bubble gum base, to which any amount of filler, colorants and other ingredients can later be added in order to transform the concentrate into a gum base.

BACKGROUND OF THE INVENTION

Chewing gum is a global industry, with products manufactured in a country or countries being exported and sold in substantial amounts to distributors, retailers and, ultimately, consumers located in other countries. The international marketing of chewing gum benefits both consumers and manufacturers. Consumers benefit from having increasing numbers of products and brands to choose from, both domestic and foreign. Manufacturers benefit from the larger potential geographical markets which international marketing can bring.

Along with benefits, international marketing also poses special problems for chewing gum manufacturers. A manufacturer who exports chewing gum to a foreign country has to pay significant shipping costs and import duties, both of which can be based on the weight, volume and/or value of the exported chewing gum products. Also, the exporting manufacturer must tailor its products to cater to special tastes and preferences of the foreign consumers, some of which can be relatively unique to a given consumer group. Often, the exporter faces competition from one or more local chewing gum manufacturers who pay much lower shipping costs and no import duties, and who are keenly familiar with the tastes and preferences of the local communities.

Chewing gum base concentrates have been considered as a way of reducing some of the import duties and shipping costs. The base portion of chewing gum typically contains certain components or blends of components which distinguish the particular chewing gum base from other chewing gum bases, including gum bases offered by various competitors of a particular manufacturer. These include, for example, specific types of elastomer, elastomer plasticizer, wax and softener, in specific combinations and at specific concentrations. The base portion of a chewing gum also contains components such as fillers, colorants, whiteners and other miscellaneous ingredients which are quite standard and which are locally available at many, if not virtually all destination points. Concentrates, which are sometimes referred to as masterbatches, typically include those base ingredients which distinguish a chewing gum base or manufacturer from others, allowing the more standard ingredients to be blended locally in the country of destination.

French Patent Application 2,635,441 discloses a gum base concentrate containing up to about 85 weight percent polymer in addition to mineral fillers and plasticizers. The polymer is a high molecular weight elastomer having a numerical molecular weight of at least 220,000 and a molecular weight by weight of at least 450,000.

U.S. Pat. No. 4,305,962, issued to del Angel, discloses an elastomer.resin master batch which is formed by mixing a finely ground ester gum resin with a latex elastomer to form an emulsion, coagulating the emulsion using sodium chloride and sulfuric acid, separating the coagulated solid crumbs from the liquid phase, washing the solid crumbs and removing the excess water.

U.S. Pat. No. 4,187,320, issued to Koch et al., discloses a two stage process for preparing a chewing gum base. In the first stage, a solid elastomer, an elastomer solvent and an oleaginous plasticizer are combined and mixed together under conditions of high shear. In the second stage, a hydrophobic plasticizer, a non-toxic vinyl polymer and an emulsifier are added to the mixture and mixed using high shear.

U.S. Pat. No. 4,064,274, issued to Mackay et al., discloses a chalk-free chewing gum base containing particles of free saccharin acid and fruit acid dispersed in a blend of elastomer, hard wax, elastomer solvent and hydrophilic detackifier.

U.S. Pat. No. 4,379,169, issued to Reggio et al., discloses a filler-free bubble gum base which contains about 0.5–25% elastomer, about 50–85% ester gum resin, about 1–25% plasticizing agent, about 0–10% softener and about 1–20% waxes, all based on the weight of the gum base. The plasticizing agent, which is characterized in the reference as "unique", includes fatty acids such as oleic acid, lauric acid, lactic acid, isostearic acid, caprylic acid, capric acid or stripped cocoa; glycerol esters of fatty acids such as mono-, di-, or tri-glycerol esters of any of the fatty acids listed above, with monooleate being preferred; polyglycerol esters of fatty acids having a hydrophilic/hydrophobic character of HLB 2 to 13, or sorbitan or polysorbate esters of fatty acids.

U.S. Pat. No. 4,452,820, issued to D'Amelia et al., discloses a gum base including a properly plasticized elastomer, a properly plasticized resin and, optionally, a third emulsifying/softening/texturizing component. The primary resin used is high molecular weight polyvinyl acetate.

U.S. Pat. No. 3,995,064, issued to Ehrgott et al., discloses a chewing gum base which contains elastomer, elastomer solvent, hydrophobic plasticizers, hydrophilic plasticizer, oleaginous plasticizer, emulsifier, and, optionally, filler, pigment and other additives.

U.S. Pat. No. 4,490,395, issued to Cherukuri et al., discloses a chewing gum base containing elastomer, elastomer solvent, polyvinyl acetate, glycerol monostearate, wax and, optionally, filler.

SUMMARY OF THE INVENTION

The present invention relates to a universal gum base concentrate including a synthetic elastomer, a synthetic elastomer plasticizer, little or no filler, a wax, and a softener. The universal gum base concentrate of the invention can later be blended with fillers, flavoring agents, colorants, and other gum base ingredients to produce any of a variety of synthetic bubble gum bases or other chewing gum bases. The gum bases can then be further blended with additional flavoring agents, softeners, sweeteners, and other ingredients to produce any of a variety of bubble gums and other chewing gums.

The universal bubble base concentrate of the invention contains about 15 to about 25 weight percent synthetic elastomer, about 40 to about 70 weight percent synthetic elastomer plasticizer, about 0 to about 3 weight percent filler, about 10 to about 25 weight percent wax and about 1 to about 12 weight percent softener. Fillers, including calcium carbonate for gum bases or chewing gums with non-acidic flavor and sweetener ingredients and talc for gum bases or chewing gums with acidic ingredients, are standard and are locally available in most or all countries. By adding a high amount of filler at a later stage, a lower cost, more economical gum base can be produced which has acceptable bubble stability and texture. By adding a smaller amount of filler at a later time, a more expensive, higher quality bubble gum base can be produced, depending also on the amount and type of flavor added to the gum base and to the chewing gum. Hence, the universal gum base concentrate of the invention can be used for more expensive or less expensive gum bases and chewing gums containing either acidic or non-acidic ingredients including a variety of flavors.

With the foregoing in mind, it is a feature and advantage of the invention to provide a universal gum base concentrate which can be later combined with additional standard ingredients to produce a variety of standard gum bases and chewing gums.

It is also a feature and advantage of the invention to provide a universal gum base concentrate which can be combined with various quantities and types of fillers, including calcium carbonate as well as talc, to produce various gum base concentrates for use in either an acidic or non.acidic chewing gum environment.

It is also a feature and advantage of the invention to provide a universal gum base concentrate which can later be combined with various non-standard ingredients in order to cater to special tastes and preferences of chewing gum consumers in different countries and locations.

The foregoing and other features and advantages of the invention will become further apparent from the following detailed description of the presently preferred embodiments and the accompanying examples. The detailed description and examples are to be considered as illustrative rather than limitative, the scope of the invention being defined by the appended claims and equivalents thereof.

DETAILED DESCRIPTION OF THE PRESENTLY PREFERRED EMBODIMENTS

In accordance with the invention, a universal gum base is provided which includes about 15 to about 25 weight percent of a synthetic elastomer. Synthetic elastomers suitable for use in the present invention include, but are not limited to, styrene-butadiene copolymer, isobutylene-isoprene copolymer, polyisobutylene and combinations thereof. Preferably, the synthetic elastomer constitutes about 17 to about 21 weight percent of the universal gum base concentrate.

The universal gum base concentrate of the invention also includes about 40 to about 70 weight percent of a synthetic elastomer plasticizer. The presently preferred synthetic elastomer plasticizers are terpene resins, such as polymers of beta-pinene, alpha pinene, dipentene or d-limonene, and combinations thereof. Preferably, the synthetic elastomer plasticizer constitutes about 55 to about 65 weight percent of the universal gum base concentrate.

The universal gum base concentrate of the invention includes about 10 to about 25 weight percent wax. Waxes suitable for use in the invention include, but are not limited to, microcrystalline wax, paraffin wax and combinations thereof. Preferably, the wax constitutes about 12 to about 15 weight percent of the universal gum base concentrate.

The universal gum base concentrate of the invention includes about 1 to about 12 weight percent softener. Softeners suitable for use in the invention include, but are not limited to, partially hydrogenated vegetable oil, glycerol monostearate and combinations thereof. Preferably, the softener constitutes about 1 to about 9 weight percent of the universal gum base concentrate.

Finally, the universal gum base concentrate of the invention includes about 0 to about 3 weight percent filler. The amount of filler should be kept at the minimum amount required to stabilize the molten gum base concentrate during its manufacture and subsequent processing. Fillers suitable for use in the invention include, but are not limited to, calcium carbonate, talc and combinations thereof. Preferably, the filler will constitute about 0 to about 1 weight percent of the universal gum base concentrate.

Antioxidants can be used to prevent oxidation of the universal gum base concentrate of the invention during its manufacture and subsequent processing. Suitable antioxidants include, but are not limited to, beta carotenes, acidulants (e.g. Vitamin C), propyl gallate, butylated hydroxyanisole (BHA), butylated hydroxtoluene (BHT), tertiary butyl hydroquinone (TBHQ) and tocopherols. Antioxidants typically constitute about 0.01 to about 0.10 weight percent of the gum base concentrate.

The universal gum base concentrate of the invention can be manufactured by adding an amount of the synthetic elastomer, the synthetic elastomer plasticizer, filler (if any) and antioxidants to a heated sigma blade mixer with a front to rear blade speed ratio of typically 2:1. The initial amounts of ingredients are determined with the working capacity of the mixing kettle in order to attain a proper consistency. After the initial ingredients have massed homogeneously, the balance of the synthetic elastomer plasticizer, filler (if any), wax and softener are added in a sequential manner until a completely homogeneous molten mass is attained. This can usually be achieved in one to four hours, depending on the exact formulation of the universal gum base concentrate. The final mass temperature can be between 60° C. and 150° C., more preferably between 80° C. and 120° C. The completely mixed molten mass is emptied from the mixing kettle into coated or lined pans, extruded or cast into any desirable shape and allowed to cool and solidify.

The universal gum base concentrate of the invention is now ready for packaging and shipment to a customer who can prepare a bubble gum base or other gum base and/or, ultimately, bubble gum or other chewing gum.

Chewing gum compositions typically comprise a generally water soluble bulk portion, a water insoluble chewing gum base portion and typically water insoluble flavoring agents. The water soluble portion dissipates with a portion of the flavoring agent over a period of time during chewing. The gum base portion is retained in the mouth throughout the chewing process.

The insoluble gum base generally comprises elastomers, elastomer plasticizers, waxes, fats, oils, softeners, emulsifiers, fillers, texturizers and miscellaneous ingredients such as antioxidants, preservatives, colorants and whiteners. The gum base constitutes between 5–95% by weight of the chewing gum composition, more typically 10–50% by weight of the chewing gum, and most commonly 25–35% by weight of the chewing gum.

Elastomers constitute about 5 to about 95 percent by weight of the base, preferably between 10 and 70 percent by weight and most preferably between 15 and 45 percent by weight. Elastomers may include synthetic elastomers such as polyisobutylene, polybutadiene, isobutylene-isoprene copolymer, styrene-butadiene copolymer, polyvinylacetate, vinyl acetatevinyl laurate copolymer, polyethylene, ethylene vinyl acetate, polyvinyl alcohol or mixtures thereof. Elastomers may also include natural elastomers, including natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof. Elastomers provide the rubbery, cohesive nature to the gum which varies depending on the elastomer's chemical and physical properties, and how the elastomer is blended with other ingredients. Synthetic elastomers are contemplated for use with the present invention.

Elastomer plasticizers modify the finished gum firmness when used in the gum base. Elastomer plasticizers typically constitute from about 0 to about 75 percent by weight of the gum base, preferably 5 to 45 percent by weight and most preferably 10 to 30 percent by weight. Elastomer plasticizers include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, methyl and partially hydrogenated methyl esters of rosin, pentaerythritol ester of rosin or mixtures. Elastomer plasticizers also include synthetics such as terpene resins derived from alpha-pinene, beta-pinene, dipentene or di-limonene, and combinations thereof. The present invention contemplates the use of one or more terpene elastomer plasticizers.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight percent of the gum base. Waxes aid in the curing of finished gum made from the gum base and also help improve the release of flavor, increase the shelf life and improve the chewing texture.

Fillers modify the texture of the gum base and aid processing. Fillers/texturizers include magnesium and calcium carbonate, ground limestone and silicate types such as magnesium and aluminum silicate, clay, alumina, talc as well as titanium oxide, mono-, di- and tricalcium phosphate, cellulose polymers such as ethyl, methyl and wood or mixtures thereof. The filler typically comprises about I to about 60 percent by weight of the gum base. Gum bases which utilize acidic ingredients preferably contain a filler that is inert to acids, most preferably talc.

Softeners modify the texture and cause the hydrophobic and hydrophilic components of the gum base and chewing gum to become more miscible. Softeners-/emulsifiers include tallow, hydrogenated tallow, lard, hydrogenated and partially hydrogenated vegetable oils, cocoa butter, glycerol monostearate, glycerol triacetate, lecithin, mono-, di- and triglycerides, acetylated mono-, di. and triglycerides, distilled mono-, di- and triglycerides, and fatty acids (e.g. stearic, palmitic, oleic, linoleic and linolenic acids) or mixtures thereof. Softeners/emulsifiers generally constitute between 0.5 and 40 weight percent of the gum base.

Antioxidants prolong shelf life and storage of the gum base, finished gum and/or their respective components including fat and flavor oils. Antioxidants may include butylated hydroxyanisole (BHA), butylated hydroxytoluene (BHT), beta-carotenes, tocopherols, acidulants such as Vitamin C, propyl gallate or mixtures thereof.

Colorants and whiteners impart desired color characteristics or remove undesired color by whitening of the base and/or chewing gum. Colorants and whiteners include FD & C type lakes, plant extracts, fruit and vegetable extracts, titanium dioxide or mixtures thereof.

Many gum bases can be prepared by adding an amount of the universal gum base concentrate of the invention to a heated sigma blade mixer with a front to rear blade speed ratio of typically 2:1. The balance of the chewing gum base ingredients including additional elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

The generally water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners include, but are not limited to, glycerin, lecithin, and mixtures thereof. Further, aqueous sweetener solutions such as those containing sorbitol, hydrogenated starch hydrolysates, corn syrup and combinations thereof may be used as softeners and binding agents in gum.

Bulk sweeteners constitute between 20–80% by weight of the chewing gum, preferably from 30–60% by weight of the chewing gum, and may include both sugar and sugarless sweeteners and components. Sugarless sweeteners are preferred for use with the present invention. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present. These may include but are not limited to sucralose, aspartame, salts of acesulfame, alitame, saccharine and its salts, cyclamic acid and its salts, dihydrochalcones, thaumatin, monellin, and the like, alone or in combination. When used, high intensity sweeteners typically constitute about 0.1 to about 1.0 weight percent of the chewing gum.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

One or more flavoring agents may be present in the chewing gum in an amount within the range of about 0.1 to about 10.0 percent and preferably from about 0.5 to about 5.0 weight percent of the gum. The flavoring agents may comprise essential oils, natural or synthetic flavors or mixtures thereof including but not limited to oils derived from plants and fruits such as citrus oils, fruit essences, peppermint oil, spearmint oil, other mint oils, clove oil, oil of wintergreen, anise, and the like.

Artificial flavoring agents and components are also contemplated. Those skilled in the art will recognize that natural and artificial flavoring agents may be combined in any sensorially acceptable fashion. All such flavors and flavor blends are contemplated by the present invention.

Optional ingredients such as colors, emulsifiers and pharmaceutical agents may also be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired for such as by rolling into sheets and cutting into sticks, extruding into chunks, or casting into pellets.

Generally, the chewing gum ingredients are mixed by first softening (e.g. with heat) the gum base and adding it to the running mixer. The base may also be softened in the mixer itself. Color or emulsifiers may also be added at this time. The moisture-containing (humectant) ingredients can be added intermittently along with portions of the bulking agent. Further portions of the bulking agent portion may be added to the mixer. High intensity sweeteners are typically added after the humectant has been thoroughly blended into the gum mass. A flavoring agent is typically added with the final portion of the bulking agent.

The gum mass is removed from the mixer and can be extruded, rolled, sheeted and processed into the desired shape and size. The entire mixing procedure typically takes from twenty to thirty minutes, but longer mixing times may sometimes be required. Those skilled in the art will recognize that variations of the above described procedure, or different procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1-3

Examples of universal gum base concentrate include those prepared according to the following formulae.

| | Example 1 | Example 2 | Example 3 |
|---|---|---|---|
| SYNTHETIC ELASTOMERS (% by weight) | | | |
| Styrene-butadiene copolymer | 13.1 | 22.3 | 19.2 |
| Isobutylene-isoprene copolymer | 2.6 | 1.0 | — |
| Polyisobutylene | 4.3 | — | — |
| SYNTHETIC ELASTOMER PLASTICIZERS (% by weight) | | | |
| Beta-pinene polymer | 52.1 | 22.0 | — |
| Alpha-pinene polymer | 5.8 | 22.0 | — |
| D-limonene polymer | — | 4.9 | 59.4 |
| WAXES (% by weight) | | | |
| Microcrystalline Wax | 9.6 | 5.2 | 7.3 |
| Paraffin Wax | 5.4 | 7.7 | 6.5 |
| SOFTENERS (% by weight) | | | |
| Partially hydrogenated vegetable oil | — | 3.9 | 0.7 |
| Glycerol Monostearate | 5.1 | 7.9 | 5.8 |
| FILLER (% by weight) | | | |
| Talc | 2.0 | 3.0 | 1.0 |
| ANTIOXIDANT (% by weight) | | | |
| BHT | — | 0.1 | 0.1 |

EXAMPLES 4-9

Examples of bubble gum bases which can be prepared using the universal gum base concentrates of Examples 1-3 include those prepared according to the following formulae, in which 30-80 weight percent universal gum base concentrate is combined with 70-20 weight percent additional filler.

| BUBBLE GUM BASE CONCENTRATION | Example 4 | Example 5 | Example 6 | Example 7 | Example 8 | Example 9 |
|---|---|---|---|---|---|---|
| UNIVERSAL GUM BASE CONCENTRATE (% by weight) | | | | | | |
| Example 1 | 30 | — | — | 60 | — | — |
| Example 2 | — | 40 | — | — | 70 | — |
| Example 3 | — | — | 50 | — | — | 80 |
| ADDITIONAL FILLER (% by weight) | | | | | | |
| Calcium Carbonate | 70 | — | — | — | 30 | — |
| Talc | — | 60 | 50 | 40 | — | 20 |

The bubble gum bases of Examples 4-9 can be used in a wide variety of bubble gum formulations and/or other appropriate chewing gum formulations.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A universal gum base concentrate consisting essentially of:

about 15 to about 25 weight percent of a synthetic elastomer;

about 40 to about 70 weight percent of a synthetic elastomer plasticizer;

about 10 to about 25 weight percent wax;

about 1 to about 12 weight percent softener;

0 to about 3 weight percent filler; and 0 to about 0.10 weight percent antioxidant.

2. The universal gum base concentrate of claim 1 wherein the synthetic elastomer constitutes about 17 to about 21 weight percent of the universal gum base concentrate.

3. The universal gum base concentrate of claim 1 wherein the synthetic elastomer comprises an elastomer selected from the group consisting of styrene-butadiene copolymer, isobutylene-isoprene copolymer, polyisobutylene and combinations thereof.

4. The universal gum base concentrate of claim 1 wherein the synthetic elastomer plasticizer constitutes about 55 to about 65 weight percent of the universal gum base concentrate.

5. The universal gum base concentrate of claim 1 wherein the synthetic elastomer plasticizer comprises a terpene resin selected from the group consisting of polymers of beta-pinene, polymers of alpha-pinene, polymers of d-limonene and combinations thereof.

6. The universal gum base concentrate of claim 1 wherein the wax constitutes about 12 to about 15 weight percent of the universal gum base concentrate.

7. The universal gum base concentrate of claim 1 wherein the wax comprises microcrystalline wax.

8. The universal gum base concentrate of claim 1 wherein the wax comprises paraffin wax.

9. The universal gum base concentrate of claim 1 wherein the softener constitutes about 1 to about 9 weight percent of the universal gum base concentrate.

10. The universal gum base concentrate of claim 1 wherein the softener comprises a softener selected from the group consisting of partially hydrogenated vegetable oil, glycerol monostearate and combinations thereof.

11. The universal gum base concentrate of claim 1 wherein the filler constitutes 0 to about 1 weight percent of the universal gum base concentrate.

12. The universal gum base concentrate of claim 1 wherein the filler comprises calcium carbonate.

13. The universal gum base concentrate of claim 1 wherein the filler comprises talc.

14. The universal gum base concentrate of claim 1 including about 0.01 to about 0.10 weight percent antioxidant.

15. The universal gum base concentrate of claim 14 wherein the antioxidant comprises an antioxidant selected from the group consisting of beta carotenes, acidulants, propyl gallate, butylated hydroxyanisole, butylated hydroxytoluene, tertiary butyl hydroquinone, tocopherols, and combinations thereof.

16. A universal bubble gum base concentrate consisting primarily of:

about 15 to about 25 weight percent of a synthetic elastomer selected from the group consisting of styrene-butadiene copolymer, isobutylene-isoprene copolymer, polyisobutylene and combinations thereof;

about 40 to about 70 weight percent of a terpene resin;

about 10 to about 25 weight percent wax;

about 1 to about 12 weight percent softener; and 0 to about 3 weight percent filler.

17. The universal bubble gum base concentrate of claim 16 wherein the synthetic elastomer constitutes about 17 to about 21 weight percent of the universal bubble gum concentrate.

18. The universal bubble gum base concentrate of claim 16 wherein the terpene resin constitutes about 55 to about 65 weight percent of the universal bubble gum base concentrate.

19. A method of preparing a gum base, comprising the steps of:

mixing about 15 to about 25 weight percent synthetic elastomer, about 40 to about 70 weight percent synthetic elastomer plasticizer, about 10 to about 25 weight percent wax, about 1 to about 12 weight percent softener, and 0 to about 3 weight percent filler together to form a universal gum base concentrate; and separately mixing the universal gum base concentrate with an additional quantity of filler to form a gum base.

20. The method of claim 19 wherein the gum base is a bubble gum base.

21. The method of claim 19 wherein the synthetic elastomer constitutes about 17 to about 21 weight percent of the universal gum base concentrate.

22. The method of claim 19 wherein the synthetic elastomer is selected from the group consisting of styrene-butadiene copolymer, isobutylene-isoprene copolymer, polyisobutylene and combinations thereof.

23. The method of claim 19 wherein the synthetic elastomer plasticizer constitutes about 55 to about 65 weight percent of the universal gum base concentrate.

24. The method of claim 19 wherein the synthetic elastomer plasticizer comprises a terpene resin.

25. The method of claim 19 wherein the wax constitutes about 12 to about 15 weight percent of the universal gum base concentrate.

26. The method of claim 19 wherein the wax is selected from the group consisting of paraffin wax, microcrystalline wax and combinations thereof.

27. The method of claim 19 wherein the softener constitutes about 1 to about 9 weight percent of the universal gum base concentrate.

28. The method of claim 19 wherein the softener is selected from the group consisting of partially hydrogenated vegetable oil, glycerol monostearate and combinations thereof.

29. The method of claim 19 wherein filler constitutes 0 to about 1 weight percent of the universal gum base concentrate.

30. The method of claim 19 wherein the filler in the universal gum base concentrate is selected from the group consisting of calcium carbonate, talc and combinations thereof.

31. The method of claim 19 wherein the filler in the universal gum base concentrate comprises talc.

32. The method of claim 19 wherein between 30–80 weight percent universal gum base concentrate is combined with between 70–20 weight percent additional filler.

33. The method of claim 19 wherein the additional filler is selected from the group consisting of calcium carbonate, talc and combinations thereof.

34. The method of claim 19 wherein the additional filler comprises calcium carbonate.

35. The method of claim 19 wherein the additional filler comprises talc.

* * * * *